US009034473B2

United States Patent
Fessenbecker et al.

(10) Patent No.: US 9,034,473 B2
(45) Date of Patent: May 19, 2015

(54) METHOD FOR PASSIVATING A METALLIC SURFACE WITH A BASIC COMPOSITION

(75) Inventors: Achim Fessenbecker, Waghaeusel (DE); Bernd Laubusch, Buerstadt (DE); Oihana Elizalde, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 347 days.

(21) Appl. No.: 13/252,651

(22) Filed: Oct. 4, 2011

(65) Prior Publication Data

US 2012/0082859 A1    Apr. 5, 2012

Related U.S. Application Data

(60) Provisional application No. 61/389,736, filed on Oct. 5, 2010.

(51) Int. Cl.
| | | |
|---|---|---|
| *B32B 15/08* | (2006.01) | |
| *C09D 133/02* | (2006.01) | |
| *C08F 220/06* | (2006.01) | |
| *C08L 33/02* | (2006.01) | |

(52) U.S. Cl.
CPC ............ *C08F 220/06* (2013.01); *C09D 133/02* (2013.01); *C08L 33/02* (2013.01)

(58) Field of Classification Search
None
See application file for complete search history.

(56) References Cited

U.S. PATENT DOCUMENTS

| | | | |
|---|---|---|---|
| 3,308,078 A | 3/1967 | Rogers et al. | |
| 4,126,595 A * | 11/1978 | Martorano et al. | ........... 524/512 |
| 2002/0146515 A1 | 10/2002 | Schwartz et al. | |
| 2006/0099429 A1 * | 5/2006 | Domes et al. | ................. 428/447 |
| 2006/0162820 A1 | 7/2006 | Dietsche et al. | |
| 2008/0199416 A1 | 8/2008 | Nguyen Kim et al. | |
| 2009/0123742 A1 | 5/2009 | Vandermeulen et al. | |
| 2012/0080120 A1 | 4/2012 | Feβenbecker et al. | |
| 2012/0080121 A1 | 4/2012 | Vandermeulen et al. | |

FOREIGN PATENT DOCUMENTS

| | | |
|---|---|---|
| DE | 195 16 765 A1 | 7/1996 |
| EP | 0 907 762 | 4/1999 |
| EP | 1 229 086 A1 | 8/2002 |
| WO | WO 97/40208 | 10/1997 |
| WO | WO 2004/074372 A1 | 9/2004 |
| WO | WO 2006/021308 A1 | 3/2006 |
| WO | WO 2006/134116 A1 | 12/2006 |
| WO | WO 2006/134117 A1 | 12/2006 |
| WO | WO 2007/010035 A1 | 1/2007 |
| WO | WO 2007/125038 A2 | 11/2007 |
| WO | WO 2008/012248 A1 | 1/2008 |
| WO | WO 2009/047209 A1 | 4/2009 |
| WO | WO 2012/045712 A1 | 4/2012 |
| WO | WO 2012/045713 A1 | 4/2012 |

OTHER PUBLICATIONS

International Search Report issued Dec. 27, 2011 in PCT/EP2011/067284 (with English Translation of Categories of Cited Documents).

* cited by examiner

*Primary Examiner* — Monique Jackson
(74) *Attorney, Agent, or Firm* — Oblon, McClelland, Maier & Neustadt, L.L.P.

(57) ABSTRACT

A method for passivating a metallic surface, by treating the surface with a basic aqueous composition comprising one polymer comprising acidic groups, a cationic crosslinker and a volatile basic compound, allows a durable passivation of fragile metal surfaces.

8 Claims, No Drawings

METHOD FOR PASSIVATING A METALLIC SURFACE WITH A BASIC COMPOSITION

The present invention relates to a method for passivating a metallic surface using an aqueous, basic composition which comprises a polymer comprising acidic groups, a cationic crosslinker, and a volatile basic compound.

The present invention further provides an aqueous, basic composition for passivating a metallic surface, the composition comprising a polymer comprising acidic groups, a cationic agent, and a volatile basic compound. The invention also relates to the use of the composition for passivating a metal surface.

The present invention likewise relates to a coating on a metallic surface obtainable by the inventively described method.

Metallic materials, more particularly iron and steel, are typically galvanized in order to protect them from corrosive environmental influences. The corrosion control afforded by the zinc derives from the fact that it is baser than the metallic material itself, and therefore is initially corroded itself. Since the zinc layer itself is also subject to corrosion (white rust), the corrosive attack on a zinc coat of this kind is frequently retarded by the application of what is called a passivation coat. The passivation coat shall retard the corrosive attack on the metal surface and may at the same time serve to provide an improved adhesion of any coats of coating material that are to be applied. Instead of the term "passivating coat", the term "conversion coat" is frequently used synonymously.

The application of passivating coats takes place, for example, for galvanized metal parts (e.g., electrogalvanized or hot dip galvanized supports) which are subsequently coated. Application also takes place for parts which are employed without coating. Similarly, metallic surfaces of aluminum or of aluminum alloys are frequently provided with a passivating coat, especially when they are to be coated subsequently.

The raw material used for the production of sheetlike metallic workpieces, such as, for example, automobile parts, bodywork parts, equipment linings, façade claddings, ceiling claddings or window profiles, are at present typically long metal strips which, by means of suitable techniques, are shaped into the desired parts and/or joined.

The corrosion control treatment of metallic materials of these kinds is accomplished typically in multistage operations. The surface of treated metals often has a number of different layers. A corrosion control treatment may be performed at various points in the production operation. This corrosion control may be temporary or permanent. Temporary control, for example, is applied only for the storage or transportation of the metallic workpiece, such as the metal strip, for example, and is removed again before ultimate processing.

Of particular technical and economic importance are strips having a galvanized surface, more particularly strips of electrogalvanized or hot dip galvanized iron or alloys of iron such as steel, for example. Also of importance are metal strips comprising aluminum or alloys of aluminum.

In general, one or more additional coating-material coats are applied to the passivated surface. Examples of the purposes of these coating-material coats are to protect the passivation coat and the metal from corrosive gases and/or liquids, and/or from mechanical damage (such as stone chipping, for example). Such a coat may also serve esthetic purposes. Coating-material coats are typically much thicker than passivation coats. Typical thicknesses for a coat of coating material range from 4 μm to 400 μm.

In the prior art, passivation coats on surfaces of zinc or of aluminum have been obtained typically by treating the workpiece to be protected with aqueous acidic solutions of chromates (e.g., $CrO_3$) or with acidic aqueous solutions of Cr(III) salts (see EP-A 0 907 762).

In the presence of atmospheric oxygen, the surface of zinc or alloys of zinc or of aluminum or alloys of aluminum in general first develops a thin oxide layer which retards corrosive attack on the underlying metal. Typically in the passivating methods based on chromium compounds, this existing oxide film, along with some of the metal to be protected, is dissolved, and is incorporated at least partly into a film on the metal surface.

This film resembles the naturally existing oxide film and in general comprises specifically introduced phosphate, heavy metals and/or fluorides. The resulting passivation or conversion coats shall effectively protect the underlying metal from corrosive attack.

More recently, passivation methods, for metal-coated steel panels and piece goods (e.g., hot dip galvanized steel), for example, have also been developed that are based on polymers as organic film-formers. In these methods, usually acidic aqueous solutions of various film-forming polymers, containing carboxyl, phosphoric acid and/or phosphonic acid groups, for example, are used to form the passivation coat. Following the application of the acidic formulation, there is typically partial dissolution of the metal surface (e.g. zinc) and polyvalent metal ions (e.g., $Zn^{2+}$) are released. Typically there is an increase in pH in the vicinity of the metal surface. This leads normally to crosslinking and film-forming of the acidic polymers with the polyvalent metal ions.

Since, with the passivation method described, using acidic polymers, the use of heavy metals such as chromium is avoided, these polymer-based passivation methods are gaining steadily in importance. Known in the prior art are various—mostly acidic—passivating preparations, which in general comprise a water-soluble, film-forming polymer containing acid groups. Methods for passivation using these preparations have also already been described.

DE-A 195 16 765 relates to a method for generating conversion coats on surfaces of zinc or of aluminum by treatment with an acidic solution which comprises an organic film-former and also aluminum ions in the form of a water-soluble complex with chelate-forming carboxylic acids and phosphoric acids. Organic film-formers cited include carboxyl-containing polymers, more particularly homopolymers and/or copolymers of acrylic and/or methacrylic acid.

WO 2004/074372 describes the passivation of metallic surfaces using copolymers comprising acrylic acid and vinylphosphonic acid and/or maleic acid, the passivating formulation possibly comprising further components.

WO 2008/012248 describes acidic preparations for passivating metallic surfaces, comprising copolymers synthesized from monomethacrylic esters having hydrophobic groups (e.g., hydroxyethyl acetate), monomers with phosphonic acid groups (e.g., vinylphosphonic acid), and monomers with carboxyl groups (e.g., acrylic acid).

WO 2006/134116 describes a method for passivating metallic surfaces by treatment thereof with an aqueous composition comprising acid-group-containing polymers and polyvalent cations such as zinc, calcium, magnesium or aluminum ions.

WO 2006/134117 describes a method for passivating metallic surfaces by treatment thereof with an aqueous composition comprising acidic polymers, with addition of waxes (e.g., polyethylene waxes).

Aqueous passivating solutions of this kind, for the purpose of improving the corrosion control, are often applied to the galvanized steel strip directly after the galvanizing line (e.g. after hot dip galvanizing). Application is generally accomplished by means of roll technology, with, for example, simple squeeze rolls or more technologically sophisticated roll coaters being employed.

In the case of the squeeze roll, which is technologically simple and inexpensive to realize, the passivating solution is applied to the galvanized steel strip (by spraying, for example) and then squeezed off using a roll. Using the squeeze-roll technology it is frequently possible only to obtain substandard, i.e., less uniform, passivation coats. If the applied coats are subject to particular requirements, the more sophisticated and more costly roll-coater technology is employed, where the passivating solution is first applied to one or more rolls and then transferred to the steel strip. With this method it is usually possible to obtain more homogeneous passivation coats with a relatively uniform thickness.

In general the time available for film-forming, i.e., crosslinking, by the acidic polymer is comparatively short. In the case of the continuous passivation of a steel strip, the time remaining from the application of the formulation to the steel strip until the drying of the coated strip in the drier, depending on line speed, is normally just a few seconds—typically, for example, 2 to 10 seconds.

WO 2009/047209 describes a continuous method for the coating of steel strips, where the passivating composition is first applied to a coating roller, taken off by a doctor blade, and then transferred to the steel strip.

In zincked metal surfaces there is frequently a certain fraction of aluminum present (e.g., in a hot dip galvanized coating, around 0.2% Al to 99.8% Zn). In passivating formulations described in the prior art, therefore, fluorides are frequently added as adjuvants. In an acidic medium, fluoride can act as a complexing agent for the aluminum oxide ($Al_2O_3$) present on the surface. Fluorides are undesirable on account of their environmental properties (toxicity) and the costly and inconvenient wastewater treatment that results.

Typically the passivating methods described in the prior art and using an acidic, aqueous formulation based on polymers containing acid groups entail the crosslinking of the acid-group-containing polymer from inside to outside (for instance, by zinc ions extracted at the metal surface), i.e., from the metal surface toward the air/film layer interface. As a result of this, there is often an incompletely crosslinked uppermost polymer layer formed, which, accordingly, remains water-soluble. It can be detached; the corrosion resistance decreases and the surface exhibits an unattractive appearance. These inadequately crosslinked passivating layers give rise, for example, to unfavorable values in the stack test. In said test, the coated metal surfaces are stacked atop one another. The stacks are then exposed to water over a period of several days.

It is an object of the present invention to provide compositions and methods for the treatment of metal surfaces that are suitable for the formation of a passivation coat on metal surfaces, the intention being to achieve a stable passivating film coat that as far as possible is consistently crosslinked. The passivation coats ought, moreover, to offer enhanced corrosion control for the metal surface.

A further object of the present invention is to provide a fluoride-free passivating composition.

The passivation coat obtained is to be suitable not only for workpieces which are subsequently coated but also for those which are employed without coating. In this context, in the event of subsequent coating of the workpieces, it must be borne in mind that sufficient adhesion of the subsequent coating-material coat to the passivation coat is ensured. This means that the adhesion of coating material to the passivation coat should improve (or at least not deteriorate). The quality of coating-material adhesion can be determined using cross-cut test (see also DIN ISO Standard 2409) on a planar metal surface and/or on a metal surface with defined denting. For this purpose, a defined cross-cut pattern is insized into the coating down to the coated substrate. A defined adhesive tape is then placed over the cross-cut and peeled off. The delamination of the coated cross-cut elements is then evaluated visually and typically reported using characteristic cross-cut values, on a scale from 0 to 5.

Also of importance are the optical qualities of polymer-containing passivation coats, with clear and transparent coats being desired. The optical qualities may be adversely affected by the phenomenon known as "chalking". When affected by this phenomenon, the coats are no longer completely clear and transparent, but instead more or less nontransparent, white spots. "Chalking" can easily be confused with the formation of white rust, and may make quality control more difficult. Therefore, the passivation coats produced with the method of the invention or by means of the composition of the invention ought to have clear, transparent optical properties and a low propensity toward chalking.

It has surprisingly been found that on a metallic surface, more particularly on metallic surfaces comprising zinc and/or aluminum, a passivating, corrosion-inhibiting polymer layer is formed if polymers comprising acidic groups are applied to the metal surface in the form of their aqueous (clear), alkaline solution (more particularly at a pH of 9.5 to 11), the solution further comprising at least one volatile base, more particularly ammonia, and at least one cationic crosslinker (e.g., polyvalent metal ions, more particularly $Zn^{2+}$, and/or a polyamine).

With the method of the invention it is possible to obtain highly stable, thoroughly crosslinked passivation coats which in particular exhibit good corrosion resistance in the stack test.

The passivating composition of the invention, moreover, is preferably free from heavy metal compounds, more particularly chromium compounds, and from fluorides. Under alkaline conditions no additional complexing agent is needed in order to dissolve the aluminum oxide ($Al_2O_3$) layer.

A further advantage is the paint adhesion on the metallic surfaces coated with the method of the invention, said adhesion being improved relative to unpassivated metallic surfaces and/or to passivation coatings of the prior art.

Coat formation in the method of the invention may take place with crosslinking of the acidic polymers with the cationic crosslinkers as a result of a reduction in pH, following the volatilization of the volatile base, for example. In a strongly alkaline medium, the cationic crosslinkers are present in deprotonated form or as salt of oxo acids and/or hydroxo acids (e.g., as zincate).

A reduction in pH may lead to the release of cationic charge (e.g., $Zn^{2+}$ or polyammonium ions) and to crosslinking with the acidic groups, present in deprotonated form, of the film-forming polymer. The crosslinking therefore may take place both from outside to inside, i.e., starting from the air/water film phase boundary, and from inside to outside, i.e., starting from the metal surface/water film phase boundary. The latter may take place as a result of the alkaline dissolution of the metal, e.g., of Al and Zn, at the metallic surface, with evolution of hydrogen and with a drop in the pH.

The crosslinking of hydrophobic, acrylate-containing polymer dispersions with polyvalent cations such as zinc ions and the addition of ammonia are known in floor care/floor sealing, among others. U.S. Pat. No. 3,308,078 describes a composition for coating various surfaces, comprising a polymer emulsion with an organic film former, ammonia, and a metal-releasing complex.

The present invention pertains to a method for passivating a metallic surface, in particular a metallic surface essentially consisting of one or more metals selected from the group consisting of zinc (Zn), aluminum (Al), and magnesium (Mg), wherein a metallic surface is contacted with an aqueous composition comprising (or consisting of) the following components:
  a) at least one water-soluble polymer (X) comprising acidic groups, the polymer (X) having at least 0.6 mol of acid groups/100 g of polymer; more particularly, the acidic groups are selected from carboxyl groups, sulfonic acid groups, phosphoric groups and/or and phosphonic acid groups;
  b) at least one volatile basic compound (B), preferably selected from ammonia, $C_{1-6}$ alkyl amines and $C_{1-6}$ alkanolamines;
  c) at least one cationic crosslinker selected from polyvalent metal ions (M) and cationic polymers (P), more particularly cationic polyamines;
  d) at least one solvent (L), comprising at least 80% by weight of water;
  e) optionally one or more surfactants (T);
  f) optionally further components (K);
  the pH of the aqueous composition being in the range from 9 to 12, preferably in the range from 9.5 to 11.

The present invention pertains more particularly to a method for passivating a metallic surface, as described above, wherein a composition is employed comprising (or consisting of):
  a) 10% to 40% by weight of at least one water-soluble polymer (X) comprising acidic groups, the polymer (X) having at least 0.6 mol of acid groups/100 g of polymer;
  b) 1% to 20% by weight of at least one volatile basic compound (B), preferably selected from ammonia, $C_{1-6}$ alkylamines, and $C_{1-6}$ alkanolamines;
  c) 0.01% to 25% by weight of at least one cationic crosslinker selected from polyvalent metal ions (M) (preferably $Mg^{2+}$, $Ca^{2+}$, $Zn^{2+}$, $Mn^{2+}$, $Fe^{2+}$, $Cr^{3+}$, $Al^{3+}$, $Ti^{4+}$, $Zr^{4+}$, $Ce^{3+}$, $Ce^{4+}$, more preferably $Zn^{2+}$) and cationic polymers (P), more particularly cationic polyamines (more particularly selected from tetraethylenepentamine, polyethyleneimines, polyethyleneimine derivatives, polyvinylamines, and polyimidazoles,
  d) 20% to 89% by weight of at least one solvent (L), comprising at least 80% by weight of water;
  e) optionally 0% to 3% by weight of at least one surfactant (T),
  f) optionally 0% to 30% by weight of at least one further component (K),
  the pH of the aqueous composition being in the range from 9 to 12, preferably in the range from 9.5 to 11.

The invention also relates to the formulations and compositions themselves and to their preparation.

The Polymer (X)

For passivation by means of the method of the invention, an aqueous composition is used which comprises at least one water-soluble polymer (X) comprising acidic groups. The polymers (X) employed may be homopolymers or copolymers. It is also possible for mixtures of two or more different polymers to be employed.

The formulation employed in accordance with the invention comprises preferably 10% to 40%, more preferably 15% to 35%, very preferably 15% to 30%, and frequently 18% to 25% by weight of the polymer or polymers (X), based on the amount of all of the components in the formulation (including the solvents).

The term "water-soluble" in the sense of this invention means that the polymer or polymers (X) employed are homogeneously water-soluble, in the amounts stated for the compositions. The polymers (X) employed ought preferably to be of infinite (unrestricted) miscibility with water. More particularly, the polymers employed ought to have a solubility of at least 50 g/l, preferably 100 g/l, and more preferably at least 200 g/l, in water at room temperature and a pH of 7. It should be borne in mind, however, that the solubility of the polymers (X) described, comprising acidic groups, in water is also dependent on the pH. A polymer which at one particular pH has an insufficient solubility for the intended purpose may, at another pH, have a solubility which is still sufficient.

In particular, the polymers (X) employed contain at least 0.6 mol of acid groups/100 g of polymer. The polymers preferably contain at least 0.9 mol of acid groups/100 g, more preferably at least 1 mol of acid groups/100 g, and frequently in fact at least 1.2 mol of acid groups/100 g.

The acidic groups of the polymers (X) are generally selected from carboxyl groups, sulfonic acid groups, phosphoric acid groups and/or phosphonic acid groups. The acidic groups are preferably selected from carboxyl groups, phosphoric acid groups, and phosphonic acid groups. With particular preference the polymer (X) employed is a copolymer (X1) synthesized from at least two different monomers containing acid groups, more particularly from monomers comprising carboxyl groups and from monomers comprising phosphonic acid groups.

For performing the invention it is particularly preferred to use homopolymers or copolymers which comprise acrylic acid units and/or methacrylic acid units.

More particularly the polymer (X) comprises one or more water-soluble copolymers (X1) synthesized from acrylic and/or methacrylic acid monomer units (M1) and from monoethylenically unsaturated monomers with acidic groups (M2), these monomers being different from (M1). Optionally, furthermore, there may be OH-containing acrylic esters or methacrylic esters (M3) present. Optionally there may be further monomers (M4) present as structural units.

In one preferred embodiment of the invention, the water-soluble polymer (X) is a copolymer (X1) which is synthesized from (or which comprises) the following monomers:
  M1: 30% to 90% by weight of methacrylic acid and/or acrylic acid;
  M2: 10% to 70% by weight of at least one further monoethylenically unsaturated monomer, different from (M1), which has one or more acidic groups (more particularly monoethylenically unsaturated dicarboxylic acids having 4 to 7 carbon atoms, monoethylenically unsaturated phosphoric acids, monoethylenically unsaturated phosphonic acids, preferably monoethylenically unsaturated phosphonic acids);
  optionally M3: 0% to 40% by weight of at least one OH-containing methacrylic ester and/or acrylic ester;
  optionally M4: 0% to 30% by weight of at least one further ethylenically unsaturated monomer, different from (M1), (M2), and (M3).

These % by weight figures are based on the sum total (100% by weight) of all of the monomers in the copolymer (X1).

Furthermore, the preferred polymers (X) described in WO 2009/047209 that comprise acidic groups may be used for the purposes of the present invention. For the polymers (X)

employed in the method of the invention it is possible to use the embodiments described in WO 2009/047209 in relation to the monomers (M1), (M2), (M3), and (M4).

The amount of acrylic acid and/or methacrylic acid (M1) in the copolymer (X1) is 30% to 90%, preferably 40% to 80%, and more preferably 50% to 70%, by weight, this figure being based on the sum total of all of the monomers in the polymer.

The amount of the monomers (M2) in the copolymer (X1) is 10% to 70%, preferably 20% to 60%, and more preferably 30% to 50%, by weight, based in each case on the sum total of all of the monomers in the polymer.

The monomer (M2) comprises at least one monoethylenically unsaturated monomer which is different from (M1) but is copolymerizable with (M1) and which contains one or more acidic groups, the acidic groups being selected from carboxyl groups, phosphoric acid groups, phosphonic groups or sulfonic acid groups. It is possible to use two or more different monomers (M2).

Concerning the preferred embodiments of monomer (M2), reference is made to document WO 2009/047209.

Examples of such monomers (M2) comprise crotonic acid, vinylacetic acid, $C_1$-$C_4$ monoesters of monoethylenically unsaturated dicarboxylic acids, styrenesulfonic acid, vinylsulfonic acid, allylsulfonic acid, 2-acrylamido-2-methyl-1-propanesulfonic acid (AMPS), vinylphosphonic acid, monovinyl phosphate, maleic acid, fumaric acid or itaconic acid. It is preferred to use vinylphosphonic acid as monomer (M2).

The copolymer (X1) may further comprise, optionally, at least one OH-containing acrylic ester and/or methacrylic ester as monomer unit (M3). The monomers in question are preferably monohydroxy acrylic esters and/or monohydroxy methacrylic esters. It is preferred to use hydroxyethyl acrylate as monomer (M3).

The amount of the monomers (M3) in the copolymer (X1) is 0% to 40%, preferably 1% to 30% by weight.

With regard to the further preferred embodiments of polymer (M3), reference is made to the document WO 2009/047209.

Besides the monomers (M1), (M2), and, optionally, (M3), it is possible optionally for 0% to 30% by weight of at least one further ethylenically unsaturated monomer (M4), different from (M1), (M2), and (M3), to be employed. Furthermore, preferably, no other monomers are employed.

The monomers (M4) may serve to fine-tune the properties of the copolymer (X1). It is also possible for two or more different monomers (M4) to be used. They are selected by the skilled person in accordance with the desired properties of the copolymer, with the proviso that they must be copolymerizable with the monomers (M1), (M2), and (M3). They are preferably monoethylenically unsaturated monomers. In special cases, however, small amounts of monomers having two or more polymerizable groups may also be employed. By this means the copolymer can be crosslinked to a small extent. Examples of suitable monomers (M4) comprise, in particular, aliphatic alkyl esters of (meth)acrylic acid, such as methyl (meth)acrylate, ethyl (meth)acrylate, butyl (meth)acrylate or 2-ethylhexyl (meth)acrylate. Additionally suitable are vinyl ethers or allyl ethers such as, for example, methyl vinyl ether, ethyl vinyl ether, propyl vinyl ether, 2-ethylhexyl vinyl ether, vinyl cyclohexyl ether, vinyl-4-hydroxybutyl ether, decyl vinyl ether, 2-(diethylamino)ethyl vinyl ether, 2-(di-n-butylamino)ethyl vinyl ether or methyldiglycol vinyl ether, and the corresponding allyl compounds. Likewise possible for use are vinyl esters such as, for example, vinyl acetate or vinyl propionate. It is also possible to use basic comonomers, such as acrylamide and alkyl-substituted acrylamides, for example.

Examples of crosslinking monomers comprise molecules having two or more ethylenically unsaturated groups, examples being di(meth)acrylates such as ethylene glycol di(meth)acrylate or butane-1,4-diol di(meth)acrylate or poly(meth)acrylates such as trimethylolpropane tri(meth)acrylate or else di(meth)acrylates of oligoalkylene or polyalkylene glycols, such as di-, tri- or tetraethylene glycol di(meth)acrylate. Further examples comprise vinyl (meth)acrylate or butane diol divinyl ether.

The term "(meth)acryl" as used herein refers to either an acrylic group or a methacrylic group.

The amount of all of the monomers (M4) employed, together, is 0% to 30% by weight, based on the total amount of the monomers employed. The amount is preferably 0% to 20%, more preferably 0% to 10%, by weight. If monomers (M4) with crosslinking activity are present, their amount ought in general not to exceed 5%, preferably 2%, by weight (based on the total amount of all of the monomers used for the method). The amount may be, for example, 10 ppm to 1% by weight.

Concerning the preferred embodiments of monomer (M4), reference is made to the document WO 2009/047209.

One preferred embodiment relates to the above-described method wherein the water-soluble polymer (X) is a copolymer (X1) which is synthesized (or which comprises) the following monomers:

M1: 20% to 60% by weight of acrylic acid;
M2: 20% to 60% by weight of vinylphosphonic acid;
M3: 1% to 40% by weight of hydroxyethyl acrylate.

The polymers (X) and copolymers (X1) may be prepared by methods known to the skilled person. The copolymers are prepared preferably by radical polymerization of the stated components (M1), (M2), and, optionally, (M3) and/or (M4) in aqueous solution. Details relating to the conduct of a radical polymerization are known to the skilled person. Preparation processes for the copolymers (X1) are described in, for example, WO 2006/021308 or WO 2006/134116.

The synthesized copolymers (X1) can be isolated from the aqueous solution by means of typical methods known to the skilled person, as for example by evaporating the solution, spray drying, freeze drying or precipitating. Preferably, the copolymers (X1), after the polymerization, are not isolated from the aqueous solution; instead, the resultant solutions of the copolymers are used as they are (optionally after addition of further adjuvants) for the method of the invention. In order to facilitate such direct further use, the amount of the aqueous solvent used for the polymerization ought to be made from the start such that the concentration of the polymer in the solvent is suitable for the application. It is also possible first to prepare a concentrate, which is diluted only on site with water or, optionally, other solvents to the desired concentration.

The molecular weight, more particularly based on the weight-average molecular weight $M_w$, of the polymers (X) and copolymers (X1) used for the method of the invention is specified by the skilled person in accordance with the desired application. Use may be made, for example, of polymers having molecular weight $M_w$ of 3000 to 1 000 000 g/mol. Especially established are polymers with 5000 g/mol to 500 000 g/mol, preferably 10 000 g/mol to 250 000 g/mol, more preferably 15 000 to 100 000 g/mol, and very preferably 20 000 to 75 000 g/mol.

The Volatile Basic Compound (B)

A volatile basic compound for the purposes of the present invention is a volatile organic or inorganic compound which in aqueous solution gives a basic reaction. The vapor pressure can be employed as a measure of the volatility.

For the purposes of the present invention, a volatile basic compound (e.g., in aqueous solution) has a vapor pressure of more than 0.01 kPa (20° C.). More preferably, a volatile basic compound for the purposes of the present invention has a vapor pressure of more than 0.05 kPa (20° C.), preferably of more than 0.1 kPa (20° C.), preferably of more than 0.5 kPa (20° C.).

In the present invention it is possible to use the following volatile basic compounds: the primary, secondary, and tertiary amines having a boiling point of 100° C. or less, such as ammonia (in the form of aqueous ammonia), monomethylamine, dimethylamine, trimethylamine, monopropylamine, dipropylamine, tripropylamine, and monopentylamine, and the like.

More particularly the volatile basic compound (B) may be at least one compound selected from the group consisting of ammonia, $C_{1-4}$ alkylamines (e.g., monomethylamine, dimethylamine, trimethylamine, ethylamine) and $C_{1-4}$ alkanolamines (e.g., mono-, di-, and triethanolamine, 1-aminopropane-2-ol). It is preferred to use ammonia as volatile basic compound (B).

The aqueous composition used in accordance with the invention comprises 1% to 20%, preferably 1% to 15%, more preferably 1% to 10%, and very preferably 2% to 5% by weight of the volatile basic compound (B), based on the amount of all of the components of the aqueous composition (including the solvents).

The aqueous composition used in the method of the invention has a pH in the range from 9 to 12, preferably in the range from 9.5 to 11. The pH of the aqueous composition is dependant on the nature and concentration of the polymers (X) used and also on the volatile basic compound (B). The pH may also be adjusted or influenced by further basic or acidic components in the composition.

The Cationic Crosslinker

The aqueous composition used in the method of the invention comprises at least one cationic compound which is able to function as a crosslinker for the polymer (X) comprising acidic groups. As cationic crosslinker it is possible more particularly to use at least one polyvalent cation and/or at least one cationic polymer (P), more particularly at least one cationic polyamine.

In one preferred embodiment the invention pertains to a method as described above wherein the aqueous composition comprises as cationic crosslinker at least one polyvalent metal ion (M) selected from the group consisting of $Mg^{2+}$, $Ca^{2+}$, $Zn^{2+}$, $Mn^{2+}$, $Fe^{2+}$, $Cr^{3+}$, $Al^{3+}$, $Ti^{4+}$, $Zr^{4+}$, $Ce^{3+}$, and $Ce^{4+}$, preferably $Zn^{2+}$, $Mg^{2+}$, $Ca^{2+}$, $Mn^{2+}$, and $Al^{3+}$. Preferably these ions are $Zn^{2+}$ and/or $Mg^{2+}$, and very preferably $Zn^{2+}$.

Besides these, the preparation preferably comprises no further metal ions. The ions may be present in the form of hydrated metal ions, but may also be present in the form of dissolved compounds, examples being complex compounds. The ions may in particular have complex bonds to the acidic groups of the polymer. If present, the amount of polyvalent metal ions selected from the group consisting of $Zn^{2+}$, $Mg^{2+}$, $Ca^{2+}$, $Mn^{2+}$, and $Al^{3+}$ is 0.01% to 25%, preferably 0.5% to 10%, and more preferably 1% to 5%, by weight, based in each case on the overall composition.

As cationic polymer (P) use is made in particular of a polyamine. A polyamine or a polyamine compound for the purposes of the present invention is a saturated, open-chain or cyclic organic compound comprising at least two (preferably at least five) amino groups, the amino groups being selectable from primary, secondary, and tertiary amino groups. Depending on the prevailing conditions (pH), the amino groups may be in protonated form and may carry cationic charge.

In the method of the invention, it is preferred for at least one polyamine to be selected from the group consisting of polyalkylimines (polyiminoalkylenes, e.g., polyethyleneimine PEI), alkoxylated polyethyleneimines, polyvinylimidazoles (polyvinylimidazoles), polyvinylamines, and quaternized and/or alkoxylated derivatives of the abovementioned polyamines.

In a further preferred embodiment, the invention pertains to a method as described above wherein the aqueous composition comprises as cationic crosslinker at least one cationic polymer (P) selected from polyethyleneimines, polyethyleneimine derivatives, polyvinylamines, and polyvinylimidazoles.

In particular it is also possible for alkoxylated, preferably ethoxylated and/or propoxylated, polyamine compounds to be used in the context of the present invention. Use may be made more particularly of alkoxylated polyamine compounds comprising 1 to 1000, preferably 1 to 100, preferably 1 to 50, preferably 1 to 10 alkoxy units for the purposes of the present invention.

In particular it is also possible to use quaternized polyamine compounds for the purposes of the present invention, said compounds having at least one quaternary ammonium group which may be obtained in particular by substitution on the amino group by one or more radicals selected from $C_1$-$C_6$ alkyl and benzyl, starting from the unquaternized polyamine compound.

As cationic crosslinker in the method of the invention it is preferred to use at least one polyamine (P) selected from the group consisting of polyalkylimines, (polyiminoalkylenes, e.g., polyethyleneimines PEI), alkoxylated polyalkylimines (e.g., alkoxylated polyethyleneimines), quaternized polyalkylimines (e.g., quaternized polyethyleneimines), polyvinylimidazoles (polyimidazoles), quaternized polyvinylimidazoles, alkoxylated polyvinylimidazoles, polyvinylamines, quaternized polyvinylamines, and alkoxylated polyvinylamines.

In the aqueous composition used in the method of the invention, the cationic polymer (P) may be present in an amount of 0.01% to 25%, more particularly of 0.5% to 10%, preferably 2% to 10%, more preferably 2% to 6%, by weight.

As cationic polymer (P) it is possible in particular to use a polyalkylimine, such as polyethyleneimine (PEI) or polypropyleneimine. In one preferred embodiment the aqueous composition comprises at least one polyethyleneimine.

Polyethyleneimines may be described in particular by the structural unit with the following general formula (P1)

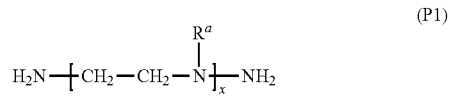

(P1)

where
  $R^a$ is selected from hydrogen, $C_{1-6}$ alkyl, benzyl or a radical based on ethyleneimine such as —$(CH_2CH_2NH)_n$·H with n' being 1 to 200
  x is 4 to 20 000, preferably 4 to 1000, preferably 4 to 300, preferably 4 to 100, more preferably 10 to 100, preferably 10 to 30.

The molecular weight of the polyethyleneimines used may be situated, for example, in the range from 100 to 800 000 g/mol, preferably in the range from 100 to 50 000 g/mol, preferably in the range from 500 to 10 000 g/mol, preferably in the range from 500 to 5000 g/mol.

The figures may be based in each case on the number-average molecular weight, on the weight-average molecular weight, or on the viscosity-average molecular weight; in particular, the figures are based on the number-average molecular weight.

The polyethyleneimines in question may in particular be branched polyethyleneimines. Also possible is the use of alkoxylated polyethyleneimines (e.g., ethoxylated or propoxylated polyethyleneimines), preferably having 2 to 20 alkoxy units.

As polyamine component (P) it is possible in particular to use polyvinylamines. Polyvinylamines may be described in particular by means of the structural unit of the general formula (P2)

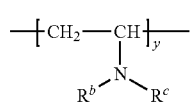

(P2)

where
y in particular is an integer from 4 to 10 000, preferably from 10 to 5000, more preferably from 10 to 1000;
$R^b$ and $R^c$ independently of one another are selected from hydrogen, $C_{1-6}$ alkyl, and benzyl.

For the purposes of the present invention it is branched polyvinylamines that are used in particular.

The molecular weight of the polyvinylamines used is situated in particular in the range from 100 to 500 000 g/mol, preferably from 500 to 250 000 g/mol, preferably in the range from 1000 to 250 000 g/mol. The figures may be based on the number-average molecular weight, on the weight-average molecular weight, or on the viscosity-average molecular weight; in particular, the figures are based on the number-average molecular weight.

In a further embodiment of the invention, it is possible as polyamine component (P) to use polyvinylimidazoles. Polyvinylimidazoles may be described in particular by a structural unit of the general formula (P3):

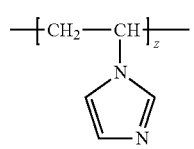

(P3)

where
z in particular is an integer from 4 to 10 000, preferably from 10 to 5000, more preferably from 10 to 1000.

The molecular weight of the polyvinylimidazoles used is situated in particular in the range from 200 to 1 000 000 g/mol, preferably in the range from 1000 to 500 000 g/mol, preferably in the range from 1000 to 200 000 g/mol. The figures may be based in each case on the number-average molecular weight, on the weight-average molecular weight or on the viscosity-average molecular weight; in particular, the figures are based on the number-average molecular weight.

In one preferred embodiment, the aqueous composition described above comprises a quaternized polyvinylimidazole. Quaternization may be accomplished in particular by addition of a $C_{1-6}$ alkyl radical and/or a benzyl radical to at least one of the nitrogen atoms of the polyvinylimidazole; in particular, the quaternization may take place with a common methylating reagent (e.g. methyl halides).

It is further advantageous to use a combination of polyamine (P) and polyvalent metal ion (M) as cationic crosslinker in the method described above.

In a further preferred embodiment, the aqueous composition used in the method described above comprises as cationic crosslinker at least one polyamine (P) as described above in an amount of 0.01% to 25% by weight, (more particularly from 0.5% to 10%, preferably 2% to 10%, more preferably 2% to 6%, by weight) and at least one polyvalent metal ion selected from the group consisting of $Mg^{2+}$, $Ca^{2+}$, $Zn^{2+}$, $Mn^{2+}$, $Fe^{2+}$, $Cr^{3+}$, $Al^{3+}$, $Ti^{4+}$, $Zr^{4+}$, $Ce^{3+}$, and $Ce^{4+}$, (preferably $Zn^{2+}$, $Mg^{2+}$, $Ca^{2+}$, $Mn^{2+}$, and $Al^{3+}$) in an amount of 0.01% to 25% by weight, (preferably 0.5% to 10% by weight and more preferably 1% to 5% by weight).

The Solvent (L)

Water is preferably used exclusively as solvent (L) in the compositions. Besides water, the solvent may comprise small amounts of water-miscible organic solvents. Small amounts of organic solvents can be used in particular, selected from monoalcohols such as methanol, ethanol or propanol, higher alcohols such as ethylene glycol or polyether polyols, ether alcohols such as butyl glycol or methoxypropanol, and N-methylpyrrolidone. As a general rule, the amount of water is at least 80% by weight (based on the total amount of solvent), preferably at least 90% by weight (based on the total amount of the solvent), and frequently at least 95% by weight (based on the total amount of solvent).

The solvent is present in the above-described aqueous composition preferably in an amount of 20% to 89% by weight, preferably of 20% to 80% by weight, preferably of 20% to 70% by weight, preferably of 20% to 60% by weight, preferably of 20% to 50% by weight.

The Surfactants (T)

A surfactant (T) may be present optionally in the aqueous composition used in the method of the invention, in an amount of 0% to 1% by weight, preferably 0% to 0.5% by weight. It is possible more particularly to use anionic, nonionic and/or cationic surfactants.

In one embodiment of the invention, the aqueous composition described above comprises 0.1% to 2% by weight, preferably 0.1% to 0.8% by weight, of at least one surfactant selected from the anionic, cationic, and nonionic surfactants known to the skilled person.

The aqueous composition used in the method described above may optionally comprise at least one surfactant (T), preferably selected from the group consisting of:
i) alkoxylated alcohols, more particularly alkoxylated (preferably ethoxylated) $C_{6-20}$ alcohols comprising 2 to 14 alkylene oxide units (more particularly ethoxy and/or propoxy units), e.g., hexanol ethoxylates
ii) alkyl sulfates, more particularly $C_{8-20}$ alkyl sulfates (e.g., 2-ethylhexyl sulfate, dodecyl sulfate)
iii) alkylsulfonates, more particularly $C_{8-20}$ alkylsulfonates (e.g., dodecylsulfonate)
iv) alkylaryl sulfates, more particularly $C_{8-20}$ alkylaryl sulfates (e.g., cumene sulfate)
v) alkylarylsulfonates, more particularly $C_{8-20}$ alkylarylsulfonates, e.g., alkylbenzenesulfonates (e.g., dodecylbenzenesulfonates)
vi) cationic surfactants, more particularly $C_{10-16}$ alkyl-trimethylammonium salts.

The Further Components (K)

As further components, the above-described aqueous composition may comprise at least one of the following components:
a. Phosphate ions, more particularly in an amount of 0% to 10%, preferably of 0.1% to 5%, by weight;
b. solubilizers (anionic, nonionic, cationic), more particularly in an amount of 0% to 1% by weight;
c. organic crosslinkers; e.g., polyamines; including those in their protonated form; more particularly in an amount of 0% to 10% by weight;
d. defoamers (e.g., silanes, modified silanes), more particularly in an amount of 0.001% to 0.1% by weight;
e. deaerating agents (e.g., long-chain alcohols), more particularly in an amount of 0.001% to 0.1% by weight;
f. activators (e.g., nitrate, nitrobenzenesulfonate), more particularly in an amount of 0% to 2% by weight, preferably of 0% to 0.5% by weight;
g. hydrogen scavengers (e.g., hydroxylammonium salts, hydrogen peroxide ($H_2O_2$), nitrate), more particularly in an amount of 0% to 2% by weight, preferably of 0% to 0.5% by weight;
h. cosolvents (e.g., 2-ethylhexyl ethoxylate, butyldiglycol, propyldiglycol), more particularly in an amount of 0% to 5% by weight, preferably of 0.1% to 2% by weight;
i. corrosion control additives (e.g., nitrogen-containing heterocycles, phosphoric esters, organic mono-, di-, and tricarboxylic acids), more particularly in an amount of 0.01% to 5% by weight, preferably of 0.1% to 2% by weight;
j. complexing agents (e.g., aminoacetic acid derivatives, phosphonic acid derivatives), more particularly in an amount of 0.01% to 5% by weight, preferably of 0.1% to 1% by weight.

The amount of additional components (K) ought in total not to be more than 30% by weight, more particularly not more than 20% by weight, preferably not more than 10% by weight, and with particular preference not more than 5% by weight (based in each case on the overall composition).

If metal ions or metal compounds are present, the compositions in question are preferably compositions which do not comprise chromium compounds. Furthermore, there ought preferably to be no metal fluorides or complex metal fluorides present. The passivation of the invention, therefore, is preferably a chromium-free passivation, more preferably a chromium- and fluoride-free passivation.

The aqueous compositions used in accordance with the invention may be obtained by mixing the components.

The metal surface that can be employed for treatment is in general any desired metal surface, the surfaces in question being more particularly those of base metals. These surfaces may be, for example, surfaces comprising or consisting substantially of iron, alloys of iron, steel, zinc (Zn), Zn alloys, aluminum (Al) or Al alloys, tin (Sn) and Sn alloys, magnesium (Mg) or Mg alloys. The steels may be either low-alloy or high-alloy steels. Frequently the metal surface comprises aluminum or alloys of aluminum, or zinc or alloys of zinc, with a surface of zinc or of alloys of zinc being obtained generally by a galvanizing operation on a metallic material such as iron or steel.

The method of the invention is suitable more particularly for passivating metallic surfaces of Zn, Zn alloys, Al or Al alloys. These surfaces may be those of bodies or workpieces composed entirely of said metals and/or alloys. Alternatively they may be the surfaces of bodies coated with Zn, Zn alloys, Al or Al alloys, it being possible for the bodies to be composed of other materials, as for example of other metals, alloys, polymers or composite materials. The surface in question may more particularly be of galvanized iron or steel. The term "galvanized" also encompasses coating with a zinc alloy, more particular hot dip galvanizing with Zn—Al alloys, and electrogalvanizing with Zn—Ni, Zn—Fe, Zn/Mn, and Zn/Co alloys.

The present invention relates preferably to a method for passivating a metallic surface which is a surface consisting substantially of one or more metals selected from the group consisting of zinc (Zn), aluminum (Al), and magnesium (Mg).

Zn alloys or Al alloys are known to the skilled person. The desired end application influences the skilled person's choice of the type and amount of alloying constituents. Typical further constituents of zinc alloys comprise more particularly Al, Mg, Pb, Si, Mg, Sn, Cu, and Cd. Also possible are Al/Zn alloys in which Al and Zn are present in approximately the same amount. The coatings may be largely homogeneous coatings or else coatings having concentration gradients. One possible example is galvanized steel which has additionally be vapor-coated with Mg. As a result of this, a Zn/Mg alloy can be produced superficially. Typical further constituents of aluminum alloys are more particularly Mg, Mn, Si, Zn, Cr, Zr, Cu, and Ti.

In one preferred embodiment of the method the surface in question is that of a strip metal, preferably comprising aluminum or an alloy of aluminum, or comprising iron or steel, especially strips of electrogalvanized or hot dip galvanized steel.

The surfaces in question are often those of shaped bodies which are obtainable from said strip metals by processing procedures such as cutting, working and/or joining. Examples are automobile bodies or parts thereof, truck bodies, paneling for household appliances (such as washing machines, dishwashers, wash driers, gas and electric cookers, microwave ovens, chest freezers or refrigerators, for example), cladding for technical appliances or apparatus (such as machines, switch cabinets, computer housings or the like, for example), components in the architectural sector (such as wall parts, facade elements, ceiling elements, windows or door profiles or partitions), and furniture made of metallic materials (such as metal cabinets or metal shelving).

The metallic surfaces for treatment may also have thin oxidic, hydroxidic and/or carbonatic surface layers or layers of similar construction. Layers of this kind form usually spontaneously on metallic surfaces in contact with the atmosphere, and are included in the term "metallic surface".

In one preferred embodiment, the method relates to a continuous method for passivating galvanized steel strips on a coil-coating line subsequent to galvanization (e.g., electrogalvanizing or hot dip galvanizing).

The method of the invention can be used to passivate steel strips galvanized on one or both sides. Galvanized steel strips have a thickness of 0.2 to 0.3 mm and widths of 0.5 to 2.5 m. Galvanized steel strips are available commercially for a variety of applications. The skilled person selects a suitable steel strip in accordance with the desired end use.

Generally speaking, the method of the invention can be performed using the known coil-coating lines, based, for example, on squeeze-roll technology or on roll-coater technology. Suitable lines are described in WO 2009/047209, for example.

The method of the invention for passivating galvanized steel strips is performed preferably by means of a continuous process using squeeze rolls. For this purpose, the galvanized steel strip is moved by means of drive rollers. The passivating composition is applied to the steel strip by spraying, using a spraying station, for example, and forms a wet film. One or more squeeze rolls squeeze off excess passivating composition. The result is a thin, wet film, which can be dried subsequently in a drier.

The steel strips may be run through the line typically with a speed of 80 to 200 m/min, preferably 50 to 150 m/min. The treatment time can be specified by the skilled person in accordance with the desired properties of the passivation coat, and with other factors. In the case of continuous processes it is advantageous for the maximum time between application of the aqueous composition to the metallic surface of the steel strip and drying of the film to be 1 to 60 s.

In the method of the invention described above, the metallic surface may be contacted with the aqueous composition, more particularly by spraying, dipping or roll application.

In one preferred embodiment, the method described above for passivating a metallic surface comprises the following steps:
i) optionally cleaning the metallic surface to remove oils, greases, dirt and/or oxide films;
ii) optionally washing the metallic surface with water;
iii) contacting a metallic surface with an aqueous composition described above, the aqueous composition being applied in the form of a wet film to the surface;
iv) drying the wet film obtained in step iii), preferably at temperatures in the range from 20 to 250° C.;
v) optionally aftertreating the passivating surface.

In one preferred embodiment, the invention pertains to a method as described above where the aqueous composition is applied to the metallic surface in the form of a wet film, the aqueous composition being applied at a coat weight in the range from 0.3 to 2 g/m$^2$, preferably 0.3 to 1 g/m$^2$, more particularly 0.4 to 0.8 g/m$^2$ (based on the sum of the solids of the aqueous composition) to the metallic surface.

The passivation coats obtainable with the described method of the invention preferably have a coat thickness in the range from 1 to 3 μm, preferably 1 to 2 μm, and a coat weight in the range from 0.3 to 2 g/m$^2$, preferably 0.3 to 1 g/m$^2$, with particular preference 0.4 to 0.8 g/m$^2$ (based on the sum of the solids in the aqueous composition).

In a further aspect, the present invention pertains to a composition for passivating a metallic surface, comprising:
a) 10% to 40% by weight of at least one water-soluble polymer (X) comprising acidic groups, the polymer (X) having at least 0.6 mol of acid groups/100 g of polymer, and where carboxyl groups and phosphonic acid groups are present preferably as acidic groups;
b) 1% to 20% by weight of at least one volatile basic compound (B) selected from ammonia, C1-4 alkylamines, and C1-4 alkanolamines;
c) 0.01% to 25% by weight of at least one cationic crosslinker selected from polyvalent metal ions (M) and cationic polyamines (P)
d) 20% to 89% by weight of at least one solvent (L), comprising at least 80% by weight of water;
e) optionally 0% to 3% by weight of at least one surfactant (T),
f) optionally 0% to 30% by weight of at least one further component (K);
the pH of the composition being in the range from 9 to 12, preferably in the range from 9.5 to 11.

In one preferred embodiment, the invention is directed to a composition (more particularly an aqueous composition) for passivating a metallic surface, comprising
a) 10% to 40% by weight of at least one water-soluble polymer (X) comprising acidic groups, the polymer (X) containing at least 0.6 mol of acid groups/100 g of polymer, and the polymer (X) more particularly comprising carboxyl groups and phosphonic acid groups;
b) 1% to 20% by weight of ammonia;
c) 0.5% to 5% by weight of at least one polyamine (P) selected from polyethyleneimines, polyethyleneimine derivatives, polyvinylamines, and polyvinylimidazoles;
d) 20% to 89% by weight of at least one solvent (L), comprising at least 80% by weight of water;
e) optionally 0.01% to 25% by weight of at least one polyvalent metal ion (M) selected from $Mg^{2+}$, $Ca^{2+}$, $Zn^{2+}$, $Mn^{2+}$, $Fe^{2+}$, $Cr^{3+}$, $Al^{3+}$, $Ti^{4+}$, $Zr^{4+}$, and $Ce^{3+}$;
f) optionally 0% to 3% by weight of at least one surfactant (T);
the composition having a pH in the range from 9 to 12, preferably in the range from 9.5 to 11.

For the stated components (polymer (X), volatile base (B), polyamine (P), metal ion (M), surfactant (T), solvent (L), and further components (K)), the preferred embodiments stated earlier on above in connection with the method of the invention are applicable.

The present invention is further directed to the use of the above-described composition for passivating a metallic surface, more particularly a metallic surface consisting substantially of one or more metals selected from the group consisting of zinc (Zn), aluminum (Al) and magnesium (Mg), more particularly of galvanized steel. The invention relates more particularly to the use of the above-described composition for passivating a galvanized steel strip in a continuous process.

The present invention further provides a coating on a metallic surface, obtainable by contacting the metallic surface with an aqueous composition comprising the following components:
a) at least one water-soluble polymer (X) comprising acidic groups, the polymer (X) having at least 0.6 mol of acid groups/100 g of polymer;
b) at least one volatile basic compound (B),
c) at least one cationic crosslinker selected from polyvalent metal ions (M) and cationic polymers (P);
d) at least one solvent (L), comprising at least 80% by weight of water;
e) optionally one surfactant (T);
f) optionally further components (K);
the pH of the aqueous composition being in the range from 9 to 12, preferably in the range from 9.5 to 11.

For the stated components (polymer (X), volatile base (B), cationic polymer (P), metal ion (M), surfactant (T), solvent (L), and further components (K)), the preferred embodiments stated earlier on above in connection with the method of the invention are applicable.

The invention is directed more particularly to an above-described coating wherein the coating additionally has one or more coating-material coats.

The present invention is elucidated in more detail with reference to the experimental examples below.

EXAMPLE 1

Use was made in each case of aqueous solutions of an acid-group-containing polymer (polymer X) of about 50% by weight of acrylic acid (monomer M1), about 30% by weight of vinylphosphonic acid (monomer M2), and about 20% by weight of hydroxyethyl acrylate (monomer M3), prepared as described in WO 2008/612248.

Initial formulations were prepared from about 20% by weight of the acid-group-containing polymer (polymer (X)), optionally 85% phosphoric acid ($H_3PO_4$) and zinc oxide (ZnO), by dissolving or dispersing the components in water, where necessary, and mixing the components. The precise quantities (in % by weight) of the components in the initial formulation are summarized in table 1.

The various initial formulations were adjusted to a pH of approximately 10.5 by addition of ammonia (volatile basic compound B). Moreover, in certain formulations, additionally, a polyethyleneimine having an average molecular weight of 2000 g/mol, as cationic crosslinker, was added. In formulation V4, additionally, a surfactant and a defoamer (modified silane) were used. As reference C1, a hot dip galvanized metal sheet without passivation was used. Formulations V1 to V4 below were produced in accordance with the details in table 1.

TABLE 1

Coating formulations

|  | C1 | V1 | V2 | V3 | V4 |
|---|---|---|---|---|---|
| Polymer (X) | — | 15 | 15 | 15 | 15 |
| Polyethyleneimine (component (P)) | — | — | — | 5 | 5 |
| NH$_3$ (25% strength) (component (B)) | — | 10 | 15 | 15 | 15 |
| H$_3$PO$_4$ | — | — | 6 | 6 | 6 |
| ZnO (component (M)) | — | 2 | 2 | 2 | 2 |
| Surfactant (T) | — | — | — | — | 0.5 |
| Defoamer | — | — | — | — | 0.05 |

EXAMPLE 2

Using the compositions described in example 1, coated test panels of hot dip galvanized steel (Gardobond OE HDG 3, 105×190 mm) were produced.

As a pretreatment, the test panels were immersed for around 30 seconds in a milk alkaline cleaner solution (Surtech 133 from Surtech), immediately rinsed off with fully demineralized water, and then dried with nitrogen. The cleaned panels were immersed at room temperature for 1 second (s) each in the formulations listed in table 1, squeezed off with a roller system, and dried in a drying cabinet at 160° C. for 12 seconds.

The peak metal temperature (PMT) in the course of drying here did not exceed 50° C.

The coated test panels thus obtained were tested for their corrosion resistance. Tests carried out were the salt spray test, the condensation cycling test (CCT), and the stack test, as described in example 3.

The test results are summarized in table 2.

TABLE 2

Test results for corrosion resistance

|  |  | X1 Reference | V1 | V2 | V3 | V4 |
|---|---|---|---|---|---|---|
| pH of solution |  | — | — | 10.5 | 10.4 | 10.5 | 10 |
| Coat weight | [g/m$^2$] | 0 | 0.8 | 0.8 | 0.8 | 0.8 |
| Salt spray test | 24 h | 0 | 6 | 9 | 10 | 10 |
| DIN ISO 9227 | 48 h | — | 3 | 7 | 8 | 9 |
|  | 72 h | — | 0 | 3 | 5 | 6 |
|  | 96 h | — | — | 0 | 0 | 3 |
| CCT DIN ISO 6270-2 | 21 cycles | 4 | 4 | 2 | 1 | 1 |
| Stack test | 1 day | 4 | 0 | 0 | 0 | 0 |
|  | 7 days | — | 3 | 2 | 1 | 1 |
|  | 14 days | — | 4 | 4 | 4 | 3 |
| Appearance of solution |  | clear | clear | clear | clear | clear |

It is apparent that coatings with the inventive compositions exhibited significantly better corrosion resistance in all test methods in comparison to test panels coated with a comparative solution.

EXAMPLE 3

The passivation coat was assessed by performance of the test procedures described below and summarized in table 2.

a) Salt Spray Test (DIN EN ISO 9227)

The quality of the corrosion control on the test panels coated in accordance with example 2 was evaluated in the neutral salt spray test as per DIN EN ISO 9227, by awarding evaluation scores of 0 to 10 in accordance with defined standards.

The evaluation score or degree of evaluation is a measure of the formation of white rust on the panel. The higher the evaluation score, the lower the proportion of the corroded surface area [%] and the better the corrosion control. The evaluation scores were awarded in accordance with table 3. An average was formed from 5 panels.

TABLE 3

Salt spray test evaluation scheme

| Corroded area [%] | Evaluation score |
|---|---|
| No defects | 10 |
| 0 < A < 0.1 | 9 |
| 0.1 < A < 0.25 | 8 |
| 0.25 < A < 0.5 | 7 |
| 0.5 < A < 1.0 | 6 |
| 1.0 < A < 2.5 | 5 |
| 2.5 < A < 5.0 | 4 |
| 5.0 < A < 10 | 3 |
| 10 < A < 25 | 2 |
| 25 < A < 50 | 1 |
| 50 < A | 0 | b) Condensation Cycling Test CCT (DIN EN ISO 6270-2)

Additionally, the panels were tested in the condensation cycling test "CCT" in accordance with DIN EN ISO 6270-2. This test consists of one or more cycles each with two test sections.

In the first section, the test specimens are exposed for 8 hours to a temperature of 40° C. and a relative humidity of 100%; in the second section, they are exposed to a temperature of 18-28° C. and a humidity of below 100% (ambient conditions). The duration of a cycle is 24 hours. The samples were assessed visually in accordance with the following criteria, as an average of 3 panels:

0 no chalking
1 slight chalking
2 moderate chalking
3 severe chalking
4 very severe chalking The resistance of the test panels coated as described above was compared against one another in a stack test.

For this purpose, three coated panels were divided in the center, wetted with 5 ml of distilled water each, and placed with the test sides against one another. Testing took place in a climatic cycling chamber, in which the stacks were weighted with a 5 kg weight and exposed to a defined number of cycles (DIN EN ISO 6270-2, AHT).

The corrosion was evaluated as the average over 3 panels, in accordance with the following evaluation scheme:

0=no change relative to fresh panel, visually satisfactory
1=incipient whitening/chalking (0-20% of the area white)

2=significant whitening/chalking and incipient white rust (20-50% of the area white)
3=severe whitening/chalking (50-80% of the area white)
4=completely corroded (80-100% of the area white)

d) Determination of Coat Weight

The coat weight was determined gravimetrically by measuring the difference between the weights before and after coating, in each case with the test panels in their demagnetized and dry condition. The weights are then converted to account for the area of the respective panels, and reported in [g/m²].

The invention claimed is:

1. An aqueous composition for passivating a metallic surface, comprising
   (a) 10 to 40% by weight of at least one water-soluble copolymer (X1) comprising acidic groups and having at least 0.6 mol of acid groups/100 g of the copolymer,
   wherein the water-soluble copolymer (X1) is synthesized from the following monomers:
      (M1) 30% to 90% by weight of methacrylic acid and/or acrylic acid;
      (M2) 10% to 70% by weight of at least one further monoethylenically unsaturated monomer, different from (M1), which has one or more acidic groups selected from the group consisting of phosphoric acid groups, phosphonic acid groups and sulfonic acid groups;
      (M3) 0% to 40% by weight of at least one OH-containing methacrylic ester and/or acrylic ester; and
      (M4) 0% to 30% by weight of at least one further ethylenically unsaturated monomer, different from (M1), (M2) or (M3),
   (b) 1% to 20% by weight of at least one volatile basic compound (B) selected from the group consisting of ammonia, C1-4 alkylamines, and C1-4 alkanolamines;
   (c) 0.01% to 25% by weight of at least one cationic crosslinker, wherein the crosslinker is at least one polyvalent metal ion (M) and at least one cationic polymer (P) selected from the group consisting of polyethyleneimines, polyethyleneimine derivatives, polyvinylamines, and polyvinylimidazoles;
   (d) 20% to 89% by weight of at least one solvent (L), comprising at least 80% by weight of water;
   (e) 0% to 3% by weight of at least one surfactant (T); and
   (f) 0% to 30% by weight of at least one further component (K),
   wherein the pH of the aqueous composition is in the range from 9 to 12.

2. The aqueous composition according to claim 1, comprising:
   (b) 1% to 20% by weight of ammonia;
   (c1) 0.5% to 5% by weight of at least one cationic polymer (P) selected from the group consisting of polyethyleneimines, polyethyleneimine derivatives, polyvinylamines, and polyvinylimidazoles; and
   (c2) 0.01% to 25% by weight of at least one polyvalent metal ion (M) selected from the group consisting of $Mg^{2+}$, $Ca^{2+}$, $Zn^{2+}$, $Mn^{2+}$, $Fe^{2+}$, $Cr^{3+}$, $Al^{3+}$, $Ti^{4+}$, $Zr^{4+}$, and $Ce^{3+}$.

3. A coating on a metallic surface, obtained by contacting a metallic surface with an aqueous composition comprising:
   (a) 10 to 40% by weight of at least one water-soluble copolymer (X1) comprising acidic groups and having at least 0.6 mol of acid groups/100 g of the copolymer,
   wherein the water-soluble copolymer (X1) is synthesized from the following monomers:
      (M1) 30% to 90% by weight of methacrylic acid and/or acrylic acid;
      (M2) 10% to 70% by weight of at least one further monoethylenically unsaturated monomer, different from (M1), which has one or more acidic groups selected from the group consisting of phosphoric acid groups, phosphonic acid groups and sulfonic acid groups;
      (M3) 0% to 40% by weight of at least one OH-containing methacrylic ester and/or acrylic ester; and
      (M4) 0% to 30% by weight of at least one further ethylenically unsaturated monomer, different from (M1), (M2) or (M3),
   (b) 1% to 20% by weight of at least one volatile basic compound (B) selected from the group consisting of ammonia, C1-4 alkylamines, and C1-4 alkanolamines;
   (c) 0.01% to 25% by weight of at least one cationic crosslinker, wherein the crosslinker is at least one polyvalent metal ion (M) and at least one cationic polymer (P) selected from the group consisting of polyethyleneimines, polyethyleneimine derivatives, polyvinylamines, and polyvinylimidazoles;
   (d) 20% to 89% by weight of at least one solvent (L), comprising at least 80% by weight of water;
   (e) 0% to 3% by weight of at least one surfactant (T); and
   (f) 0% to 30% by weight of at least one further component (K),
   wherein the pH of the aqueous composition is in the range from 9 to 12.

4. A method for passivating a metallic surface, comprising contacting a metallic surface with an aqueous composition comprising:
   (a) 10 to 40% by weight of at least one water-soluble copolymer (X1) comprising acidic groups and having at least 0.6 mol of acid groups/100 g of the copolymer,
   wherein the water-soluble copolymer (X1) is synthesized from the following monomers:
      (M1) 30% to 90% by weight of methacrylic acid and/or acrylic acid;
      (M2) 10% to 70% by weight of at least one further monoethylenically unsaturated monomer, different from (Ml), which has one or more acidic groups selected from the group consisting of phosphoric acid groups, phosphonic acid groups and sulfonic acid groups;
      (M3) 0% to 40% by weight of at least one OH-containing methacrylic ester and/or acrylic ester; and
      (M4) 0% to 30% by weight of at least one further ethylenically unsaturated monomer, different from (M1), (M2) or (M3);
   (b) 1% to 20% by weight of at least one volatile basic compound (B) selected from the group consisting of ammonia, C1-4 alkylamines, and C1-4 alkanolamines;
   (c) 0.01% to 25% by weight of at least one cationic crosslinker, wherein the crosslinker is at least one polyvalent metal ion (M) and at least one cationic polymer (P) selected from the group consisting of polyethyleneimines, polyethyleneimine derivatives, polyvinylamines, and polyvinylimidazoles;
   (d) 20% to 89% by weight of at least one solvent (L), comprising at least 80% by weight of water;
   (e) 0% to 3% by weight of at least one surfactant (T); and
   (f) 0% to 30% by weight of at least one further component (K),
   wherein the pH of the aqueous composition is in the range from 9 to 12.

5. The method according to claim 4, wherein the aqueous composition comprises at least one polyvalent metal ion (M) selected from the group consisting of $Mg^{2+}$, $Ca^{2+}$, $Zn^{2+}$, $Mn^{2+}$, $Fe^{2+}$, $Cr^{3+}$, $Al^{3+}$, $Ti^{4+}$, $Zr^{4+}$, $Ce^{3+}$, and $Ce^{4+}$.

6. The method according to claim 4, wherein the composition further comprises 0.1% to 2% by weight of at least one surfactant (T).

7. The method according to claim 4, wherein the water-soluble copolymer (X1) is synthesized from:
   (M1) 20% to 60% by weight of acrylic acid;
   (M2) 20% to 60% by weight of vinylphosphonic acid; and
   (M3) 1% to 40% by weight of hydroxyethyl acrylate.

8. The method according to claim 4, wherein the aqueous composition is applied to the metallic surface in the form of a wet film and the aqueous composition is applied at a coat-weight in the range from 0.3 to 2 $g/m^2$ to the metallic surface.

* * * * *